W. LENNOX.
TRUSS.
APPLICATION FILED JUNE 26, 1908.
910,004.                           Patented Jan. 19, 1909.
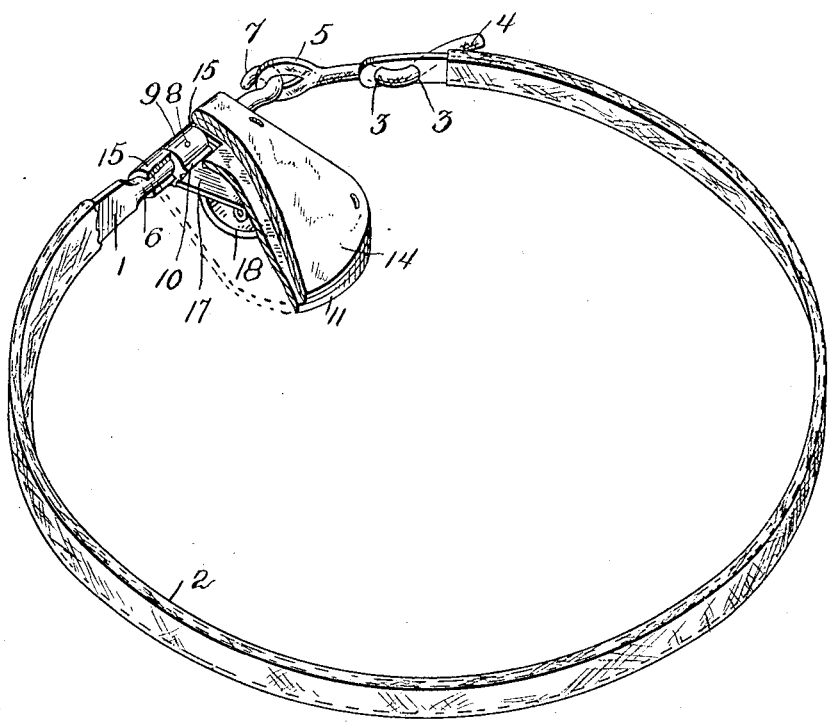
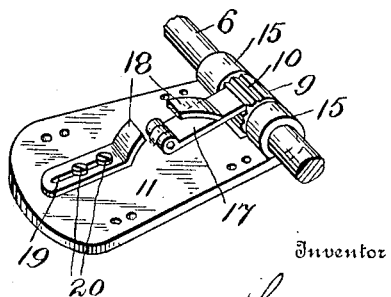

UNITED STATES PATENT OFFICE.

WILLIAM LENNOX, OF PHILADELPHIA, PENNSYLVANIA.

TRUSS.

No. 910,004.	Specification of Letters Patent.	Patented Jan. 19, 1909.

Application filed June 26, 1908. Serial No. 440,448.

*To all whom it may concern:*

Be it known that I, WILLIAM LENNOX, a citizen of the United States, residing at Philadelphia, in the county of Philadelphia and State of Pennsylvania, have invented certain new and useful Improvements in Trusses, of which the following is a specification.

This invention relates to certain new and useful improvements in trusses and the particular object of the invention is to so mount the pressure pads that the same might be adjusted at the will of the operator while on the person to increase or diminish the upward or downward pressure of the pads upon the hernia or other affected portion of the body.

Reference will be had to the accompanying drawing forming a part of this specification and wherein like numerals of reference designate corresponding parts throughout the several views in which:

Figure 1, is a perspective view partly in section, and Fig. 2, is an inverted perspective view.

Reference numeral 1 designates the belt or body encircling band formed of spring strip metal having a suitable padded covering 2 which may be in the form of a permanent covering or a removable one formed by wrapping strips of soft material as strip-chamois around the belt or band 1. One end of the belt or band 1 is provided with a number of holes 3 through which is passed the end of flexible member 4 having a looped end 5. The other end of the belt or band 1 is reduced and circular in cross section as indicated by numeral 6, the extreme end being bent to form a hook 7 for engagement with the said loop 5 of the other or first mentioned end. By adjusting the flexible member 4 in said openings 3, the size of the belt or band 1 may be varied.

Fixed to the circular or round portion 6 of the belt 1 by means of a pin 8 is a collar 9 formed with peripheral ratchet teeth 10.

The pad plate 11 which is formed preferably of metal, is formed with openings whereby the pad proper may be stitched to the plate, said pad preferably comprising a piece of folded chamois 14. One end of the pad plate is formed with hinge barrels 15 which encircle the round end 6 of the belt, one on each side of the ratchet collar 9. To the pad plate is pivoted a pawl 17 which is normally held in engagement with the ratchet teeth 10 by a spring 18 provided with a slot 19 and secured to the plate by screws 20 passing through the slot into the plate. By this arrangement it will be apparent, that the truss pad may be swung upon the round portion 6 of the belt 1 to the position necessary to properly engage the hernia or affected part, and by means of the ratchet mechanism will be retained in such adjusted position. It will be apparent that to adjust the pad in one direction the spring 18 must be slid from engagement with the pawl, but such movement of the spring is unnecessary for adjusting the pad in the other direction.

Having fully described the invention, what is claimed as new and useful and desired to be secured by Letters Patent is:

In a device of the character described, a body-encircling band having a reduced portion circular in cross section and formed with a hooked end, a flexible adjustable loop member on the other end of the band adapted to be engaged by the said hooked end, a hub rigid with the reduced portion of the band and being formed with ratchet teeth, a metal plate formed with integral hinge barrels loosely encircling the reduced end of the band one on each side of said hub, a pawl hinged at one of its ends to the plate and its other end being adapted to engage the teeth of the hub, a spring alined with said pawl and having a longitudinal sliding connection with the plate and bearing at its free upon said pawl, the engagement of the pawl with the teeth and the pressure thereon being controllable by said spring.

In testimony whereof I affix my signature in presence of two witnesses.

WILLIAM LENNOX.

Witnesses:
WALTER I. RAYMOND,
WALTER W. CALMORE.